US006070463A

United States Patent [19]

Moriya et al.

[11] Patent Number: 6,070,463
[45] Date of Patent: Jun. 6, 2000

[54] ANGULAR VELOCITY SENSOR

[75] Inventors: Kazufumi Moriya, Yokohama; Tomoyasu Hasegawa; Eiichi Takata, both of Sagamihara; Tomio Shibano, Yokohama; Tetsuo Osawa, Tokyo-to, all of Japan

[73] Assignee: Murata Manufacturing Co., Ltd., Japan

[21] Appl. No.: 08/814,834

[22] Filed: Mar. 11, 1997

[30] Foreign Application Priority Data

Mar. 11, 1996 [JP] Japan .................................. 8-082021

[51] Int. Cl.[7] .................................. G01P 9/04; G01P 3/02
[52] U.S. Cl. .................................. 73/504.12; 73/504.02; 73/504.14
[58] Field of Search .................... 73/504.02, 504.04, 73/504.09, 504.12, 504.13, 504.14, 504.15

[56] References Cited

U.S. PATENT DOCUMENTS

| | | | |
|---|---|---|---|
| 5,275,047 | 1/1994 | Zabler et al. | 73/504.12 |
| 5,600,065 | 2/1997 | Kar et al. | 73/504.12 |
| 5,604,312 | 2/1997 | Lutz | 73/504.12 |
| 5,610,334 | 3/1997 | Fima et al. | 73/504.12 |
| 5,728,936 | 3/1998 | Lutz | 73/504.12 |
| 5,734,105 | 3/1998 | Mizukoshi | 73/504.02 |

FOREIGN PATENT DOCUMENTS

| | | |
|---|---|---|
| 0709653 | 5/1996 | European Pat. Off. . |
| 29617410 U | of 1997 | Germany . |
| 6123632 | 5/1994 | Japan . |

OTHER PUBLICATIONS

Office Action Issued by the European Patent Office on Dec. 21, 1998 in the Corresponding EPC Application.

*Primary Examiner*—Hezron Williams
*Assistant Examiner*—Helen C. Kwok
*Attorney, Agent, or Firm*—Ostrolenk, Faber, Gerb & Soffen, LLP

[57] ABSTRACT

A downsized angular velocity sensor is disclosed in which the detection sensitivity is improved. An oscillator oscillatably supported by support beams along two horizontal axes is formed of two rod-like members extending along the Y axis and an interconnecting portion. A hollow region is formed between each of the rod-like members and the interconnecting portion. Displacement detecting sections are disposed in the hollow regions. The displacement detecting sections are each constructed of an antenna-like electrode array, so that a greater amount of change in capacitance generated between the antenna-like electrodes can be obtained.

20 Claims, 7 Drawing Sheets

ANGULAR VELOCITY SENSOR

BACKGROUND OF THE INVENTION

1. Field of the Invention

The present invention relates to an angular velocity sensor suitable for use in detecting the angular velocity of, for example, a rotator.

2. Description of the Related Art

In general, an angular velocity sensor serves the following function. In the directions of the three axes, that is, X, Y and Z axes, while a constant oscillation (excitation) is provided to an oscillating plate about a certain axis, for example, the X axis, a force is applied around the Z axis from the exterior and causes the oscillating plate to rotate. Then, a Coriolis force (inertial force) acts upon the oscillating plate and causes it to oscillate in the direction of the Y axis. A displacement of the oscillating plate in the Y-axis direction due to this Coriolis force can be detected by the angular velocity sensor as a change in piezoelectric resistance or capacitance. As an example of such a sensor, the angular velocity sensor which is supported at its four corners by beams disclosed in Japanese Patent Unexamined Publication No. 6-123632 is widely known.

This angular velocity sensor of a known art will now be explained with reference to FIGS. 7 and 8.

Figure 7:
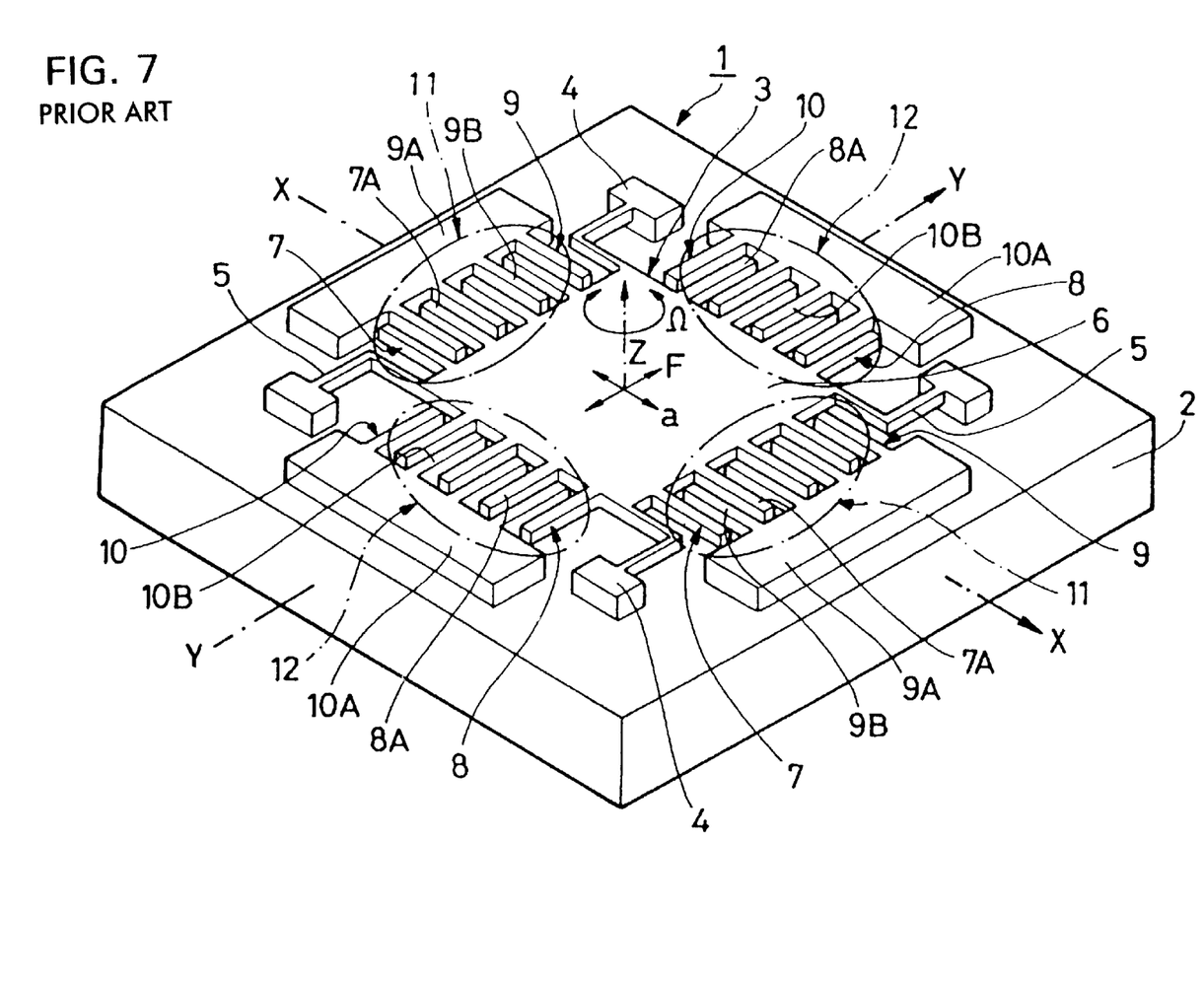
FIG. 7 is a perspective view of an angular velocity sensor of a know type.
Figure 8:
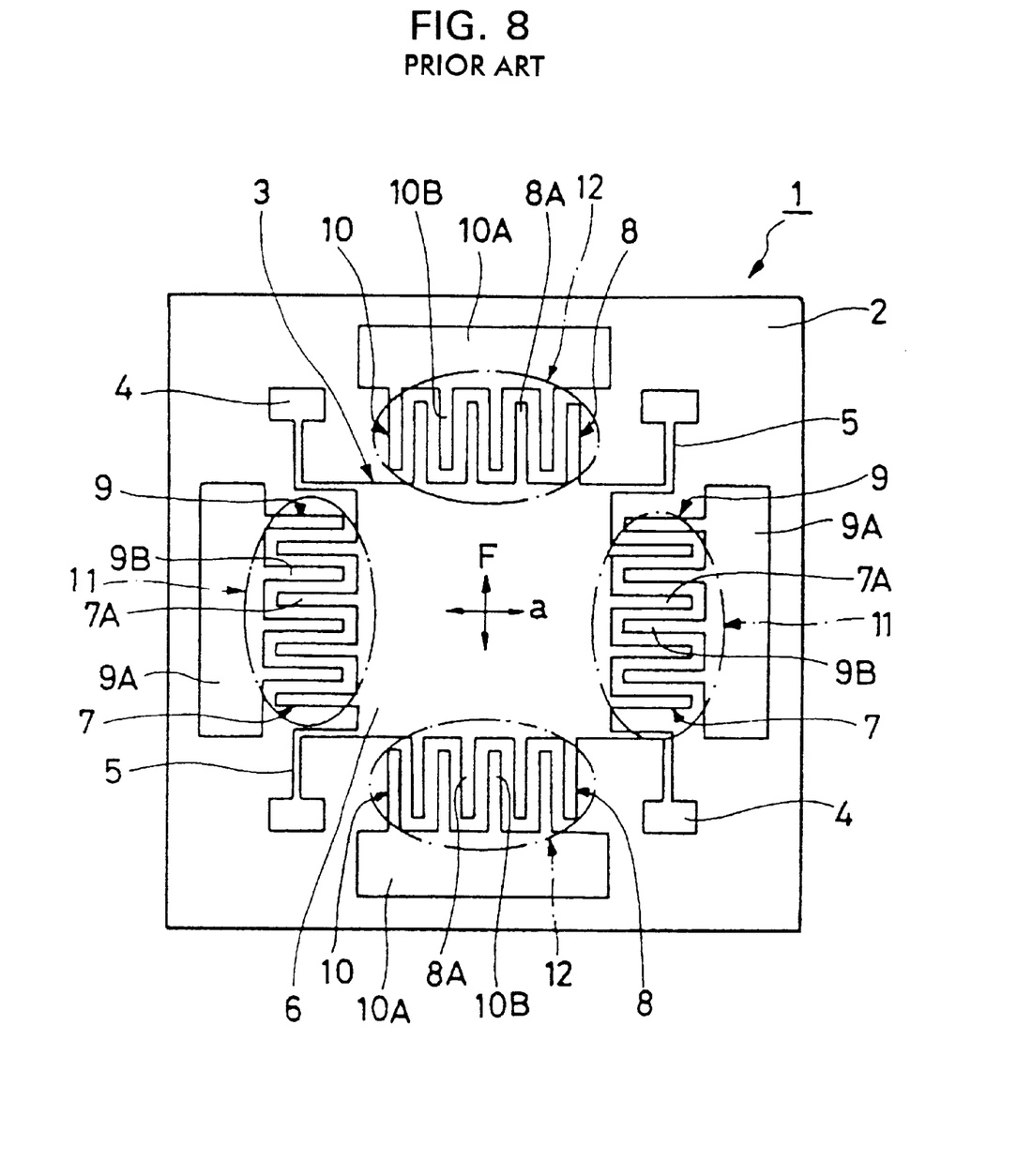
FIG. 8 is a plan view of an angular velocity sensor of a known type as viewed from the top.

In FIGS. 7 and 8, there are shown an angular velocity sensor generally designated by 1 and a rectangularly-formed substrate 2 formed of, for example, a high-resistance silicon material and constituting the main unit of the sensor 1. A moving part 3 formed of low-resistance polysilicon doped with P, B and Sb or of single-crystal silicon is formed on the substrate 2. The moving part 3 is comprised of four support portions 4 disposed at the four corners of the substrate 2, four support beams 5, and a rectangularly-formed oscillating plate 6. The support beams 5 are each formed to bend in an L shape from each support portion 4 toward the center of the sensor 1 so as to form a portion in parallel to the X axis and a portion in parallel to the Y axis. The oscillating plate 6 is displaceably supported by the four support beams 5 in directions of the X and Y axes in such a manner that it can be detached from the surface of the substrate 2. Comb-like electrodes 7, 7 serving as oscillating electrodes disposed near the moving part 3 (hereinafter referred to as "the moving-part oscillating electrodes") are formed in a projecting manner at the front and rear of the oscillating plate 6 along the X axis, each electrode 7 being formed of four electrode plates 7A. Further, comb-like electrodes 8, 8 serving as displacement-detection electrodes located close to the moving part 3 (hereinafter referred to as "the moving-part detection electrodes") are disposed at the right and left sides of the oscillating plate 6 along the Y axis, each electrode 8 being formed of four electrode plates 8A.

Among the elements of the moving part 3, only the support portions 4 are fixed on the substrate 2, and the support beams 5 and the oscillating plate 6 are supported at the four corners to be separated from the substrate 2 across a predetermined gap. Since the support beams 5 are formed in an L-shape, the oscillating plate 6 can be displaced along the X axis by deflecting the portion of the support beams 5 in parallel to the Y axis, and can be displaced along the Y axis by deflecting the portion in parallel to the X axis.

A pair of comb-like electrodes 9, 9 functioning as oscillating electrodes (hereinafter referred to as "the stationary-part oscillating electrodes") are formed on the substrate 2 so as to interpose the oscillating plate 6 between the electrodes 9, 9 from their front and rear portions. The electrodes 9, 9 are comprised of stationary parts 9A, 9A located at the front and rear of the oscillating plate 6 on the substrate 2, and four electrode plates 9B projecting from each of the stationary parts 9A, 9A so as to alternately face the respective electrode plates 7A of the aforedescribed moving-part oscillating comb-like electrode 7 with a gap therebetween.

A pair of comb-like electrodes 10, 10 functioning as displacement-detection electrodes (hereinafter referred to as "the stationary-part detection electrode") are located on the substrate 2 so as to interpose the oscillating plate 6 between the electrodes 10, 10 from their right and left sides. The electrodes 10, 10 are formed of stationary parts 10A, 10A disposed on the right and left sides of the oscillating plate 6 on the substrate 2, and four electrode plates 10B projecting from each of the stationary plates 10A so as to alternately face the respective electrode plates 8A of the above-described moving-part detection comb-like electrode 8 across gaps therebetween.

Oscillation-generating sections 11, 11 serving as oscillation-generating means are each comprised of a pair of the moving-part oscillating electrode 7 and the stationary-part oscillating electrode 9, and the respective electrode plates 7A and the electrode plates 9A are separated from each other across equally-sized clearances. Oscillation drive signals 180° out of phase having a frequency f are applied to the respective oscillation-generating sections 11, 11 between the moving-part oscillating electrodes 7 and the stationary-part oscillating electrodes 9 so as to generate alternating electrostatic attractive forces between the respective electrode plates 7A and 9A, thereby causing them in each oscillation-generating section 11 to repeatedly approach close to and move away from the stationary parts 9. The net result is that the oscillating plate 6 oscillates in the direction indicated by the arrow a, i.e., in the X-axis direction.

Displacement detecting sections 12, 12 serving as displacement detection means are each formed of one of the moving-part detection electrodes 8 and one of the stationary-part detection electrodes 10, the respective electrode plates 8A and the electrode plates 10A being separated from each other across equally-sized gaps. The electrodes 8 and 10 are constructed as plane parallel capacitors used for displacement detection. Each displacement detecting section 12 can thus detect a change in the effective areas between the electrode plates 8A and 10B as a change in capacitance.

According to the angular velocity sensor 1 constructed as described above, 180°-out-of-phase-oscillation drive signals having a frequency f are applied to the respective oscillation-generating sections 11, 11 so as to generate electrostatic attractive forces to alternately act between the respective electrode plates 7A and 9B and further drive the oscillation-generating sections 11, 11. As a result, the oscillating plate 6 can repeatedly approach close to and move away from the stationary parts 9 and oscillate in the direction indicated by the arrow a of FIGS. 7 and 8, i.e., along the X axis.

In this state, if an angular velocity $\Omega$ resulting from a force around the Z axis is produced in the angular velocity sensor 1, a Coriolis force (inertial force) is generated in the Y-axis direction, thereby causing the oscillating plate 6 to oscillate along the Y axis due to this Coriolis force expressed by the below-described equation 2.

The displacement x and the velocity V for shifting the oscillating plate 6 along the X axis caused by the movement of the oscillation-generating sections 11, 11 can be expressed by the following equation 1:

$$x = A \sin \omega_1 t$$

$$V = A\omega_1 \cos \omega_1 t \tag{1}$$

where A indicates the amplitude of the oscillating plate 6; $\omega_1$, represents the angular frequency of the drive mode; and t designates time. Further, the Coriolis force F in the Y-axis direction generated from the angular velocity $\Omega$ around the Z axis when the oscillating plate 6 oscillates with a displacement x along the X axis at the velocity V can be expressed by the following equation 2:

$$F = 2m\Omega V \tag{2}$$

where m indicates the mass of the oscillating plate 6; and $\Omega$ represents the angular velocity.

The oscillating plate 6 thus oscillates along the Y axis due to the Coriolis force F expressed by the above equation (2). A displacement of the oscillating plate 6 due to oscillation can be detected by the respective displacement detecting sections 12, 12 as a change in capacitance generated between the moving-part detection electrodes 8 and the stationary-part detection electrodes 10. The angular velocity $\Omega$ around the Z axis can also be detected.

Since the respective oscillation-generating sections 11, 11 are constructed of the moving-part oscillating electrodes 7 formed of the electrode plates 7A and the stationary-part oscillating electrodes 9 formed of the electrode plates 9A, a large effective area between the oppositely-facing electrodes 7 and 9 can be ensured. This makes it possible to produce large electrostatic attractive forces between the electrode plates 7A and 9A upon application of an oscillation drive signal to the oscillation-generating sections 11, thereby oscillating the oscillating plate 6 with a large amplitude in the direction indicated by the arrow a in FIGS. 7 and 8.

Moreover, since the respective displacement detecting sections 12, 12 are comprised of the moving-part detection electrodes 8 formed of the electrode plates 8A and the stationary-part detection electrodes 10 formed of the electrode plates 10A, the effective area between the oppositely-facing electrodes 8 and 10 can be enlarged. Thus, a displacement of the oscillating plate 6 along the Y axis, i.e., a change in the effective area between the electrode plates 8A and 10B, can be detected by the displacement detecting sections 12, 12 as a change in capacitance.

In the angular velocity sensor 1 according to the afore-described known type, since the amplitude in the detecting direction is proportional to a Coriolis force, the mass (m) of the oscillating plate 6 is required to be increased as large as possible based on Equation 2 (F=2m$\Omega$V), which heretofore has been thought to require that the area of the oscillating plate 6 be formed as large as possible. In turn, this has required location of the moving-part oscillating electrodes 7 and the moving-part detection electrodes 8, both of which are provided to improve the detection sensitivity, on the overall periphery of the oscillating plate 6, i.e., at the front and rear and at the left and right sides of the oscillating plate 6. This disadvantageously increases the overall size of the angular velocity sensor 1.

SUMMARY OF THE INVENTION

Accordingly, in order to solve the above-described problem, it is an object of the present invention to provide a downsized angular velocity sensor, based on the fact that the mass of an oscillating plate is irrelevant to its displacement in a detecting direction, in which the oscillator is configured to have a hollow region where displacement detection means are disposed.

In order to solve the above-described problems, through intense study by the inventors, the present invention has been completed based on the following fact discovered by the inventors: the mass of an oscillator is irrelevant to a displacement of the oscillator in a detecting direction.

Upon experiencing a Coriolis force, an oscillator is displaced in a detecting direction. This Coriolis force F can be expressed by the following equation 3 according to Hooke's law:

$$F = K_2 y \tag{3}$$

where $K_2$ represents a spring constant; and y indicates a displacement of the oscillator in a detecting direction.

The spring constant $K_2$ in a detecting direction can be expressed by the following equation 4:

$$K_2 = m\omega_2^2 \tag{4}$$

where $\omega_2$ designates the angular frequency of the detection mode.

Then, a displacement y of the oscillator in a detecting direction due to a Coriolis force can be expressed by the following equation 5 changed from Equation 3:

$$y = \frac{F}{K_2} \tag{5}$$

Further, Equations 2 and 4 are substituted into Equation 5 to result in the following equation 6.

$$y = \frac{2m\Omega V}{m\omega_2^2} = \frac{2\Omega V}{\omega_2^2} \tag{6}$$

Equation 6 reveals that the mass of the oscillator is irrelevant to a displacement y of the oscillator in a detecting direction due to a Coriolis force. Thus, it is necessary only that the velocity V be increased and the angular frequency $\omega_2$ of the detection mode be decreased in order to achieve high sensitivity.

In this manner, the present invention has been completed based on the above-described discovery.

More specifically, an angular velocity sensor illustrating certain features of the present invention may include a substrate and an oscillator having a hollow region, the oscillator being supported on the substrate for movement along two horizontal axes. An oscillation-generator is provided for oscillating the oscillator along a first one of said horizontal axes and a displacement detector is located within the hollow region of said oscillator for detecting displacement of the oscillator along a second one of the horizontal axes when the oscillator is oscillated along the first horizontal axis and is subject to angular velocity around a vertical axis.

According to another aspect of the present invention, there is provided an angular velocity sensor comprising: a substrate; a support beam fixed at its base end to the substrate; an oscillator disposed at the forward end of the support beam and displaceably provided along two horizontal axes in such a manner that the oscillator is detached from the surface of the substrate; oscillation-generating means for oscillating the oscillator along a first horizontal axis of the two horizontal axes; and displacement detection means for detecting a displacement of the oscillator, the displacement being caused upon generating an angular velocity around a vertical axis while the oscillator is oscillated along the first horizontal axis by the oscillation-generating means, the oscillator being displaced along a second horizontal axis of the two horizontal axes due to a Coriolis force corresponding to a change in the angular velocity, wherein the oscillator includes two rod-like members extending along the second horizontal axis and an interconnecting portion extending along the first horizontal axis for connecting the two rod-like members, and wherein the displacement detection means is at least partially located between the two rod-like members of the oscillator.

With this construction, when the angular velocity around a vertical axis is generated while an oscillator is caused to oscillate by, for example, oscillation-generating means along one axis, i.e., a first horizontal axis, of the two horizontal axes, a Coriolis force can be produced to displace the oscillator along the other axis, i.e., a second horizontal axis. A displacement of the oscillator due to this Coriolis force can be detected as a change in capacitance by displacement detection means. Moreover, a hollow region is formed between each of the rod-like members and the interconnecting portion of the oscillator, and the displacement detection means can be at least partially located in the hollow region, thereby enhancing the downsizing of the angular velocity sensor.

In the above angular velocity sensor, the oscillation-generating means may comprise a moving-part comb-like electrode having a plurality of electrode plates disposed near at least one of the rod-like members of the oscillator and extending along the first horizontal axis, and a stationary-part comb-like electrode disposed close to the substrate so as to opposedly face the moving-part comb-like electrode with a clearance, and the displacement detection means may comprise a moving-part antenna-like electrode and a stationary-part antenna-like electrode, the moving-part antenna-like electrode having a plurality of columnar portions disposed at least on one side of the interconnecting portion of the oscillator so as to axially extend in a direction orthogonal to the axis along which the comb-like electrodes are arranged, and a plurality of electrode plates provided for the columnar portions so as to extend coaxially with the comb-like electrodes, and the stationary-part antenna-like electrode having a plurality of columnar portions disposed close to the substrate so as to extend coaxially with the columnar portions of the moving-part antenna-like electrode, and a plurality of electrode plates provided for the columnar portions so as to opposedly face the electrode plates of the moving-part antenna-like electrode with clearances therebetween.

With this arrangement, the electrode plates of the moving-part antenna-like electrode and those of the stationary-part antenna-like electrode of the displacement detection means extend coaxially with the moving-part comb-like electrode of the oscillation-generating means. This can eliminate a restriction upon the amplitude of the oscillator which would otherwise be limited by the displacement detection means, thereby achieving oscillation with a large amplitude. Additionally, the effective area between the moving-part antenna-like electrode and the stationary-part antenna-like electrode can be enlarged.

Further, the displacement detection means may be arranged in such a manner that the clearances between the electrode plates of the moving-part antenna-like electrode and the electrode plates of the stationary-part antenna-like electrode may be sized to alternate between different dimensions. This makes it possible to detect a displacement of the oscillator along the second horizontal axis in the form of a change in capacitance between adjacent electrode plates.

Alternatively, the displacement detection means may be constructed in such a manner that the forward ends of the electrode plates of the moving-part antenna-like electrode and the forward ends of the electrode plates of the stationary-part antenna-like electrode may be formed to be sharp. Accordingly, the gaps between the forward ends of the respective electrode plates can be enlarged, which ensures escape vents for air required while the oscillator is oscillating.

According to another aspect of the present invention, there is provided an angular velocity sensor comprising: a substrate; a support beam fixed at its base end to the substrate; an oscillator disposed at the forward end of the support beam and displaceably provided along three horizontal axes, which are formed of two horizontal axes and a vertical axis, in such a manner that the oscillator is detached from the surface of the substrate; oscillation-generating means for oscillating the oscillator along a first horizontal axis of the two horizontal axes; first displacement-detection means for detecting a displacement of the oscillator, the displacement being caused upon generating an angular velocity around the vertical axis while the oscillator is oscillated along the first horizontal axis by the oscillation-generating means, the oscillator being displaced along a second horizontal axis of the two horizontal axes due to a Coriolis force corresponding to a change in the angular velocity; and second displacement-detection means for detecting a displacement of the oscillator, the displacement being caused upon generating an angular velocity around the second axis while the oscillator is oscillated along the first horizontal axis by the oscillation-generating means, the oscillator being displaced along the vertical axis due to a Coriolis force corresponding to a change in the angular velocity, wherein the oscillator includes two rod-like members extending along the second horizontal axis and an interconnecting portion extending along the first horizontal axis for connecting the two rod-like members, and wherein the first and second displacement-detection means are at least partially located between the two rod-like members of the oscillator.

With this construction, upon generating an angular velocity around the vertical axis while the oscillator is caused to oscillate by, for example, the oscillation-generating means along one axis, i.e., a first horizontal axis, of the two horizontal axes, a Coriolis force upon the oscillator displaces it along the other axis, i.e., a second horizontal axis. A displacement of the oscillator along the second horizontal axis due to this Coriolis force can be detected by the first displacement-detection means as a change in capacitance. In contrast, when the angular velocity around the second horizontal axis is generated, a resulting Coriolis force displaces the oscillator along the vertical axis. A displacement of the oscillator due to this Coriolis force can be detected by the second displacement-detection means as a change in capacitance. Also, a hollow region can be formed between the rod-like member and the interconnecting portion of the oscillator, and thus, the displacement detection means can be at least partially placed in the hollow region, thereby fulfilling the downsizing the angular velocity sensor.

In the above-described sensor, the oscillation-generating means may comprise a moving-part comb-like electrode having a plurality of electrode plates disposed near at least one of the rod-like members of the oscillator and extending along the first horizontal axis, and a stationary-part comb-like electrode disposed near the substrate so as to opposedly face the moving-part comb-like electrode with a clearance therebetween, and the first displacement-detection means may comprise a moving-part antenna-like electrode and a stationary-part antenna-like electrode, the moving-part antenna-like electrode having a plurality of columnar portions disposed at least on one side of the interconnecting portion of the oscillator so as to axially extend in a direction orthogonal to the axis along which the comb-like electrodes are arranged, and a plurality of electrode plates provided for the columnar portions so as to extend coaxially with the comb-like electrodes, and the stationary-part antenna-like electrode having a plurality of columnar portions disposed close to the substrate so as to extend coaxially with the columnar portions of the moving-part antenna-like electrode, and a plurality of electrode plates provided for the columnar portions of the stationary-part antenna-like electrode so as to opposedly face the electrode plates of the moving-part antenna-like electrode with clearances therebetween.

With this arrangement, the electrode plates of the moving-part antenna-like electrodes and those of the stationary-part antenna-like electrodes of the displacement detection means extend coaxially with the moving-part comb-like electrodes of the oscillation-generating means. This can obviate a restriction upon the frequency of the oscillator, which would otherwise be limited by the displacement detection means, thereby achieving oscillations with a large amplitude. Also, the effective area between the moving-part electrodes and the stationary-part electrodes can be increased. Further, while the oscillator is caused to oscillate by the oscillation-generating means along one axis of the two horizontal axes, i.e., a first horizontal axis, a force is applied to generate an angular velocity around the other axis, i.e., a second horizontal axis. This produces a Coriolis force corresponding to a change in the angular velocity. Then, a displacement of the oscillator in the vertical direction caused by this Coriolis force is detected. During this detection, the gaps between the moving-part electrodes and the stationary-part electrodes can serve as escape vents for air.

The above-described first displacement-detection means may be arranged in such a manner that the clearances between adjacent electrode plates of the moving-part antenna-like electrode and the electrode plates of the stationary-part antenna-like electrode may be sized to alternate between different dimensions. Hence, it is possible to detect a displacement of the oscillator along the second horizontal axis as a change in capacitance generated in adjacent electrode plates.

Alternatively, the first displacement-detection means may be constructed in such a manner that the forward ends of the electrode plates of the moving-part antenna-like electrode and the forward ends of the electrode plates of the stationary-part electrode may be formed to be sharp. Thus, the gaps between the forward ends of the electrode plates can be enlarged, thereby ensuring escape vents for air required during oscillation.

The second displacement-detection means may comprise a combination of the oscillator and the moving-part antenna-like electrode, and a substrate electrode disposed on the substrate. This can increase the effective area by virtue of the provision of the moving-part antenna-like electrode.

DESCRIPTION OF THE PREFERRED EMBODIMENTS

A detailed description will now be given of embodiments of the present invention with reference to the accompanying drawings, i.e., FIGS. 1 to 6.

Figure 1:
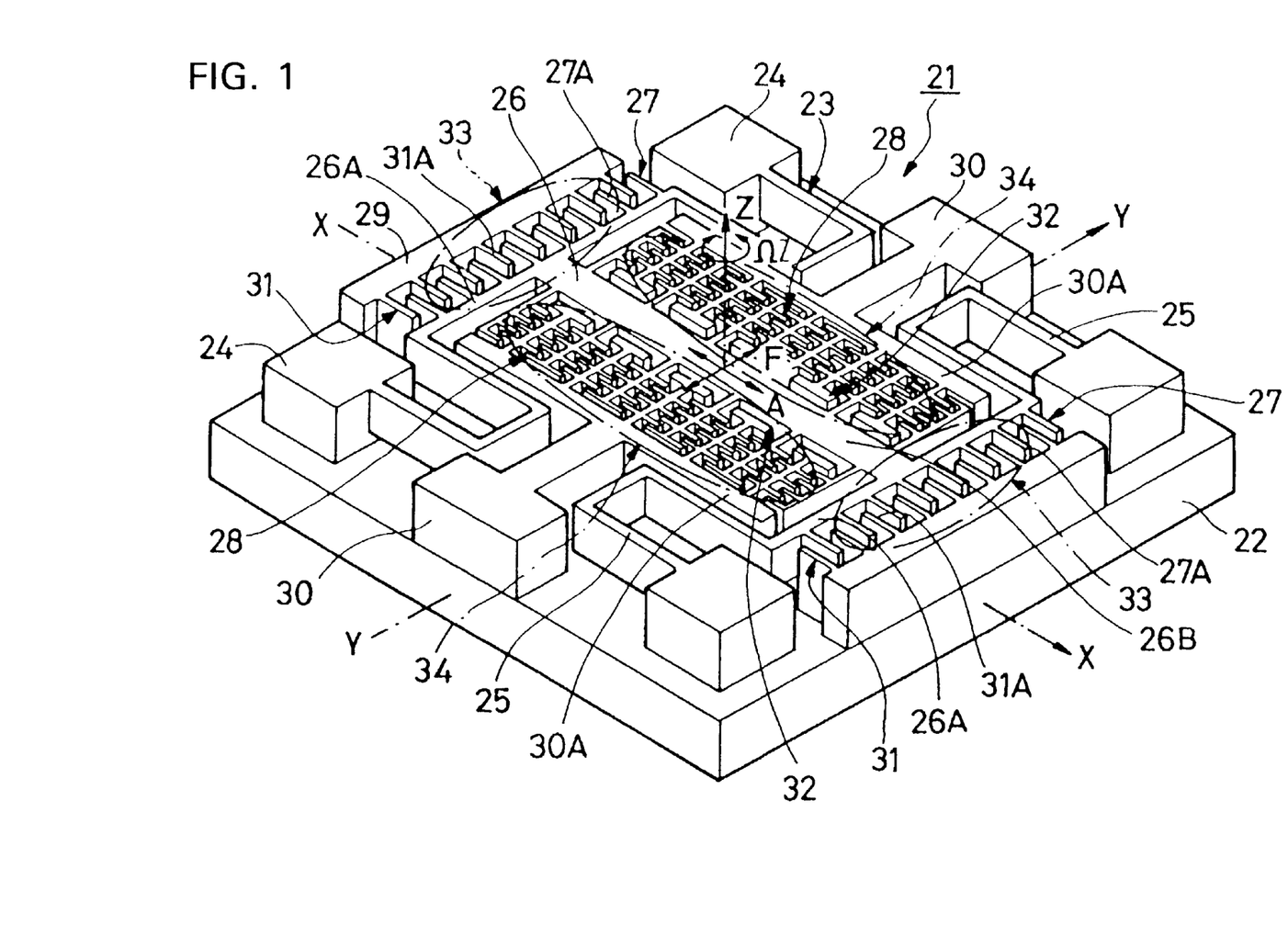
FIG. 1 is a perspective view of an angular velocity sensor according to a first embodiment of the present invention.
Figure 2:
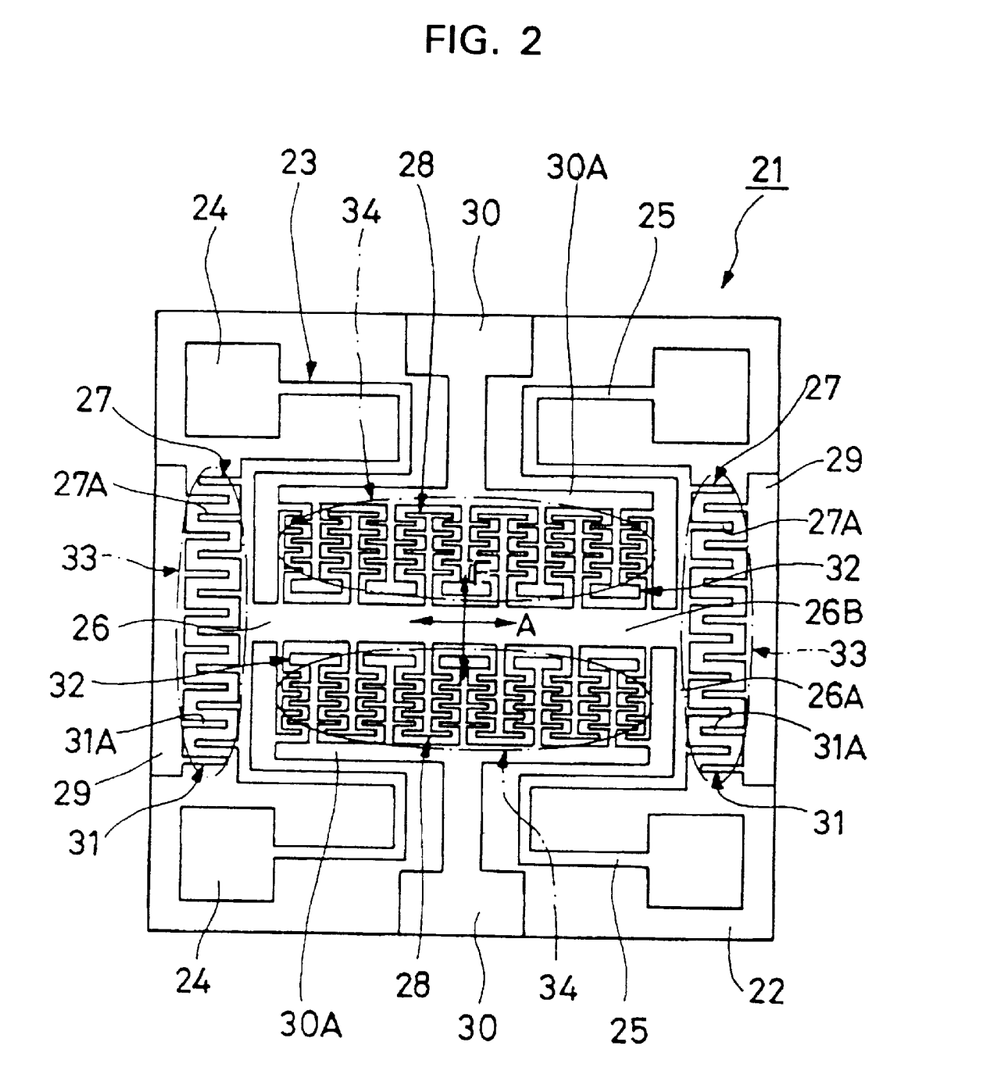
FIG. 2 is a plan view of the angular velocity sensor shown in FIG. 1 as viewed from the top.
Figure 3:
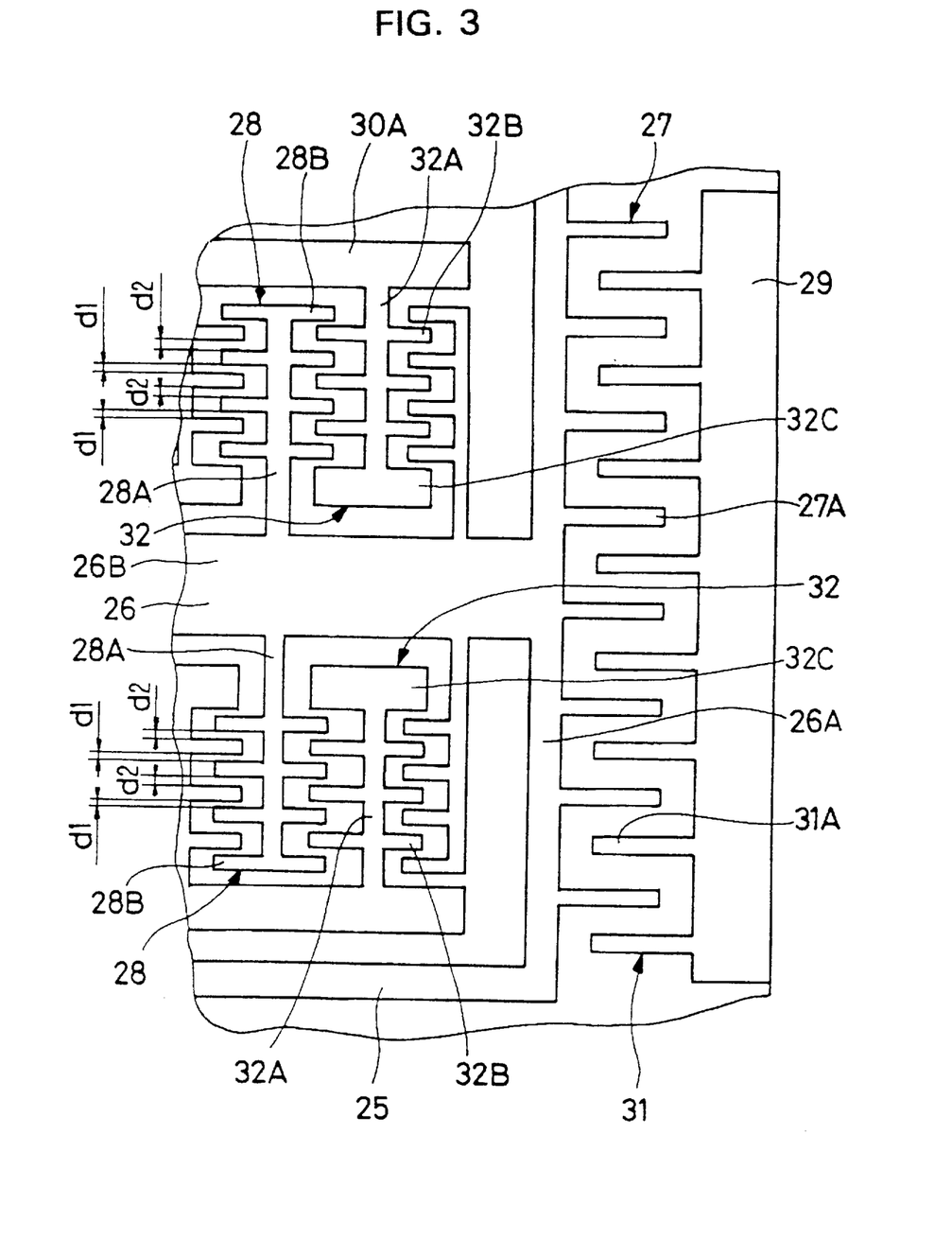
FIG. 3 is a plan view illustrating the enlarged essential portion of the angular velocity sensor shown in FIG. 1.

A reference will first be made to FIGS. 1 to 3 to explain an angular velocity sensor constructed in accordance with a first embodiment of the present invention. In FIGS. 1 to 3, there are shown an angular velocity sensor generally indicated by 21, which includes a rectangularly-formed substrate 22 formed of a high-resistance silicon material and constituting the main unit of the sensor 21, and a moving part 23 disposed on the substrate 22 and formed of low-resistance polysilicon or single-crystal silicon.

The moving part 23 is comprised of four support portions 24 respectively fixed on the four corners of the substrate 22, four support beams 25 formed to bend generally in a U shape from the respective support portions 24, and an oscillator 26 displaceably supported by the support beams 25 along the X and Y axes in such a manner that it can be detached from the surface of the substrate 22.

The support beams 25 are each extended, as shown in FIG. 2, from the corresponding support portion 24 and formed to bend generally in a U shape so as to form a portion in parallel to the X axis and a portion in parallel to the Y axis. The X-axis parallel portions of the support beams 25 can be deflected to displace the oscillator 26 along the Y axis, while the Y-axis parallel portions can be deflected to displace the oscillator 26 along the X axis. In this manner, the oscillator 26 can be supported by the respective support beams 25 displaceably along the X and Y axes in relation to the substrate 22.

The oscillator 26 is formed generally in an H shape and is constructed of two rod-like members 26A, 26A and an interconnecting portion 26B. The rod-like members 26A, 26A extend in the Y-axis direction and are firmly connected at their ends to the forward ends of the corresponding support beams 25. The interconnecting portion 26B extending in the X-axis direction serves to interconnect the rod-like members 26A, 26A at their middle portions. Hollow regions are formed on both sides of the interconnecting portion 26B between each of the rod-like members 26A, 26A and the interconnecting portion 26B. Moving-part comb-like electrodes 27, 27 are each comprised of a plurality of electrode plates 27A extending to the exterior from each rod-like member 26A along the X axis.

A plurality of antenna-like electrodes 28, 28, . . . , which form a moving-part antenna-like electrode array, are disposed at a predetermined interval along the longitudinal interconnecting portion 26B of the oscillator 26. The antenna-like electrodes 28 are each formed of a columnar portion 28A extending from the interconnecting portion 26B of the oscillator 26 along the Y axis, and a plurality of electrode plates 28B disposed on the left and right sides of each of the columnar portions 28A along the X axis. It should be noted that the antenna-like electrodes 28 located at the distal ends of the longitudinal interconnecting portion 26B are each provided with the electrode plates 28B along only one side of the columnar portion 28A.

A pair of stationary parts 29, 29 used for oscillations are disposed on the substrate 22 so as to interpose the oscillator 26 between both parts 29, 29 from the front and rear portions. A pair of stationary parts 30, 30 used for displacement detection are formed on the substrate 22 to interpose the oscillator 26 between both parts 30, 30 from the left and right sides. Provided for each of the detection stationary parts 30 is a base 30A extending along the X axis positioned closer to the center than each support beam 25.

Stationary-part comb-like electrodes 31, 31 are disposed adjacent to the respective oscillating stationary parts 29, 29 positioned at the front and rear of the oscillator 26. The electrodes 31, 31 are each comprised of a plurality of electrode plates 31A that are formed in a projecting manner to alternately face the respective electrode plates 27A of the aforedescribed moving-part electrodes 27 with clearances therebetween.

A plurality of antenna-like electrodes 32, 32, . . . , which form a stationary-part antenna-like electrode array, are disposed along the longitudinal bases 30A at a regular interval. The antenna-like electrodes 32 are each formed of a columnar portion 32A extending along the Y axis and a plurality of electrode plates 32B projecting from the left and right sides of the columnar portion 32A. The electrode plates 32B are provided to alternately face the respective electrode plates 28B of the above-noted antenna-like electrodes 28. An electrode plate 32C positioned at the forward end of each of the electrodes 32 is enlarged in the widthwise direction to serve as an anchor.

Oscillation-generating sections 33, 33 serving as oscillation-generating means are each comprised of the moving-part electrodes 27 and the stationary-part electrodes 31. Equally-sized gaps are formed, as illustrated in FIG. 3, between the electrode plates 27A of the electrode 27 and the corresponding electrode plates 31A of the electrode 31. With this construction, 180°-out-of-phase-oscillation drive signals having a frequency f are applied to the oscillation-generating sections 33 between the moving-part electrodes 27 and the stationary-part electrodes 31 so as to generate electrostatic attractive forces between the electrode plates 27A and 31A formed along the X axis, thereby oscillating the oscillator 26 in the direction indicated by the arrow A.

In this embodiment, the moving part 23 is formed so that the natural frequency of the oscillator 26 can coincide with the frequency of an oscillation drive signal. This produces resonance in the oscillator 26, thereby increasing the amplitude of the oscillator 26 in the X-axis direction.

Displacement detecting sections 34, 34 used as displacement detection means are each located in the aforedescribed hollow region defined between each of the rod-like members 26A and the interconnecting portion 26B of the oscillator 26. The sections 34, 34 are each comprised of a plurality of antenna-like electrodes 28 forming the moving-part antenna-like electrode array, and a plurality of antenna-like electrodes 32 forming the stationary-part antenna-like electrode array. Each of the electrode plates 28A of the electrodes 28 is separated from each of the electrode plates 32B of the electrodes 32 with a clearance therebetween, the electrodes 28 and 32 being formed as plane parallel capacitors for displacement detection.

The electrode plates 28B and 32B are arranged to face each other, as illustrated in FIG. 3, so that the above-described clearances between the adjacent plates 28B and 32B are sized to alternate between a smaller dimension d1 and a larger dimensions d2. In this arrangement, the relationships between the dimensions d1 and d2 of the clearances between the adjacent electrode plates 28B and 32B of the upper and lower detecting sections 34 are symmetrical to each other with respect to the interconnecting portion 26B. Accordingly, the relationship between the capacitance C1 of the plane parallel capacitor formed in the clearance having the dimension d1 and the capacitance C2 of the plane parallel capacitor formed in the gap having the dimension d2 results in C1>>C2, and only clearances having the smaller dimension d1 can serve as plane parallel capacitors. As a consequence, the displacement detecting section 34 can detect a displacement of the oscillator 26 along the Y axis in the form of a change in capacitance caused by variations in the dimension d1.

Further, the displacement detecting sections 34, 34 are connected to each other so as to calculate a difference between an output from the detecting section 34 located above the interconnecting portion 26B and an output from the detecting section 34 positioned below the interconnecting portion 26B. Consequently, variations in the dimensions of the clearances between the electrode plates 28B and 32B can be detected as a change in capacitance, and the difference between the detection signals from the respective upper and lower detecting sections 34 is calculated. This makes it possible to detect a change in capacitance in the form of a high level signal.

More specifically, in FIG. 3, when the oscillator 26 shifts in the—direction along the Y axis (downward in FIG. 3), a signal representing a capacitance $+\Delta C$ due to a decrease $\Delta_1$ of the dimension d1 is output from the upper displacement detecting section 34, while a signal representing a capacitance $-\Delta C$ caused by an increase $\Delta d1$ of the dimension d1 is output from the lower detecting section 34. Since the detecting sections 34 are connected to each other so that a difference between the detection signals output from the respective detecting sections 34 can be calculated, the resulting signal can be detected according to the equation expressed by $+\Delta C-(-\Delta C)=2\Delta C$. Thus, a displacement of the oscillator 26 can be detected in the form of a signal having a higher level. Similarly, when the oscillator 26 shifts in the reverse direction, i.e., in the + direction along the Y axis (upward in FIG. 3), a detecting operation similar to the operation described above can be performed.

Subsequent to the description of the construction of the angular velocity sensor 21 of this embodiment, an explanation will now be given of the detecting operation of the angular velocity 21.

Oscillation drive signals are first applied to the oscillation-generating sections 33, 33 so as to generate electrostatic attractive forces between the electrode plates 27A of the moving-part electrodes 27 and the electrode plates 31A of the stationary-part electrodes 31, thereby oscillating the oscillator 26 in the X-axis direction as indicated by the arrow A.

In this state, upon generating angular velocity $\Omega Z$ around, for example, the Z axis, a Coriolis force proportional to the magnitude of the angular velocity $\Omega Z$ and to the amplitude of the oscillator 26 is produced along the Y axis and acts upon the oscillator 26 displaceable in the Y-axis direction. Hence, the oscillator 26 is caused to oscillate and is displaced along the Y axis due to this Coriolis force, thereby changing the dimensions d1 and d2 of the clearances between the electrode plates 28B of the electrodes 28 forming the moving-part antenna-like electrode array and the electrode plates 32B of the electrodes 32 forming the stationary-part antenna-like electrode array. This further enables the displacement detecting sections 34 to detect a change in the clearances between the electrode plates 28B and 32B in the form of a change in capacitance. Thus, the angular velocity ΩZ around the Z axis can be detected.

Also, the oscillator 26 is constructed to have the interconnecting portion 26B and a plurality of antenna-like electrodes 28 forming the moving-part antenna-like electrode array which are formed on the left and right sides of the interconnecting portion 26B. Consequently, the area of the oscillator 26 can be reduced, and the gaps between the electrode plates 28B of the electrodes 28 can serve as escape vents for air required during oscillation. It is thus possible to reduce the air damping occurring in the known type of oscillating plate having a larger area, which would otherwise increase the oscillation restrictions imposed upon the oscillator 26 in the direction indicated by the arrow A of FIG. 1. Thus, the oscillator 26 can be oscillated with a larger amplitude.

Additionally, the displacement detecting sections 34 are each comprised of the moving-part antenna-like electrode array formed of a plurality of antenna-like electrodes 28 and the stationary-part antenna-like electrode array formed of a plurality of antenna-like electrodes 32. Thus, the number of the electrode plates 28B and 32B of the respective electrodes 28 and 32 can be increased to enlarge the effective area formed by the plates 28B and 32B. This makes it possible to detect a greater amount of change in capacitance by the displacement detecting sections 34 when the angular velocity ΩZ is generated, thereby enhancing the sensitivity of the detecting sections 34.

The relationships between the dimensions d1 and d2 of the clearances formed between the electrode plates 28B and 32B of the upper and lower detecting sections 34 are symmetrical to each other with respect to the interconnecting portion 26B. Because of the relationship between the dimensions d1 and d2 indicated by d1<<d2, the respective displacement detecting sections 34 can detect displacements of the oscillator 26 along the Y axis in the form of a change in capacitance due to variations in the dimension d1. Additionally, displacements of the oscillator 26 along the Y axis can be detected in the form of a differential capacitance by the detecting sections 34, 34 positioned at the left and right sides of the interconnecting portion 26B of the oscillator 26. Thus, a higher level signal can be output based on a differential capacitance, thereby enabling high-sensitivity detection.

Moreover, this embodiment reveals that the mass of the oscillator 26 is irrelevant in increasing the displacement of the oscillator 26 along the Y axis according to Equations 3 to 6 shown above. Accordingly, the displacement detecting sections 34 can be each accommodated in the hollow region between each of the rod-like members 26A and the interconnecting portion 26B. This embodiment is thus advantageous, because the substrate 22 can be made smaller and the angular velocity sensor 21 can be downsized, over the known type of angular velocity sensor in which the displacement detecting sections 12 are required to be disposed around the oscillating plate 6.

According to the above description, in the angular velocity sensor 21 of this embodiment, the oscillator 26 is formed generally in an H shape so as to decrease its area. Also, a plurality of antenna-like electrodes 28 forming the moving-part antenna-like electrode array are disposed on the left and right sides of the interconnecting portion 26B of the oscillator 26, so that the gaps between the electrode plates 28B can be used as escape vents for air, and thus, air damping restricting the oscillation of the oscillator 26 can be reduced. This enables the oscillator 26 to oscillate with a large amplitude in the direction indicated by the arrow A caused by the oscillation-generating sections 33. Additionally, a capacitance produced between the electrodes 28 and 32 of the respective moving-part antenna-like electrode array and the stationary-part antenna-like electrode array, both of which constitute the displacement detecting sections 34, can be increased to detect a higher level signal corresponding to the angular velocity ΩZ around the Z axis. As a consequence, the sensitivity of the overall angular velocity sensor 21 for detecting the angular velocity ΩZ can be significantly improved. Further, the displacement detecting sections 34 can be each placed within a hollow region of the oscillator 26 defined between each of the rod-like members 26A and the interconnecting portion 26B, thereby enhancing the downsizing of the overall angular velocity sensor 21.

A second embodiment of the present invention will now be described while referring to FIGS. 4 and 5. This embodiment is characterized in that an electrode is formed on a substrate (hereinafter simply referred to as "the substrate electrode") which faces an oscillator and moving-part antenna-like electrodes. The substrate electrode and the moving-part antenna-like electrode constitute second displacement-detection means for detecting a displacement of the oscillator along the vertical axis due to a change in capacitance generated by a clearance between the substrate electrode and the moving-part antenna-like electrode array.

In this embodiment, the same elements as those of the first embodiment are designated by like reference numerals, and an explanation thereof will thus be omitted. It should be noted that reference numeral 34 indicating the displacement detecting sections of the first embodiment represents first displacement-detecting sections 34 serving as first displacement-detection means, and the oscillator 26 of this embodiment is adapted to be displaceable along three axes, i.e., X, Y and Z axes.

Figure 4:
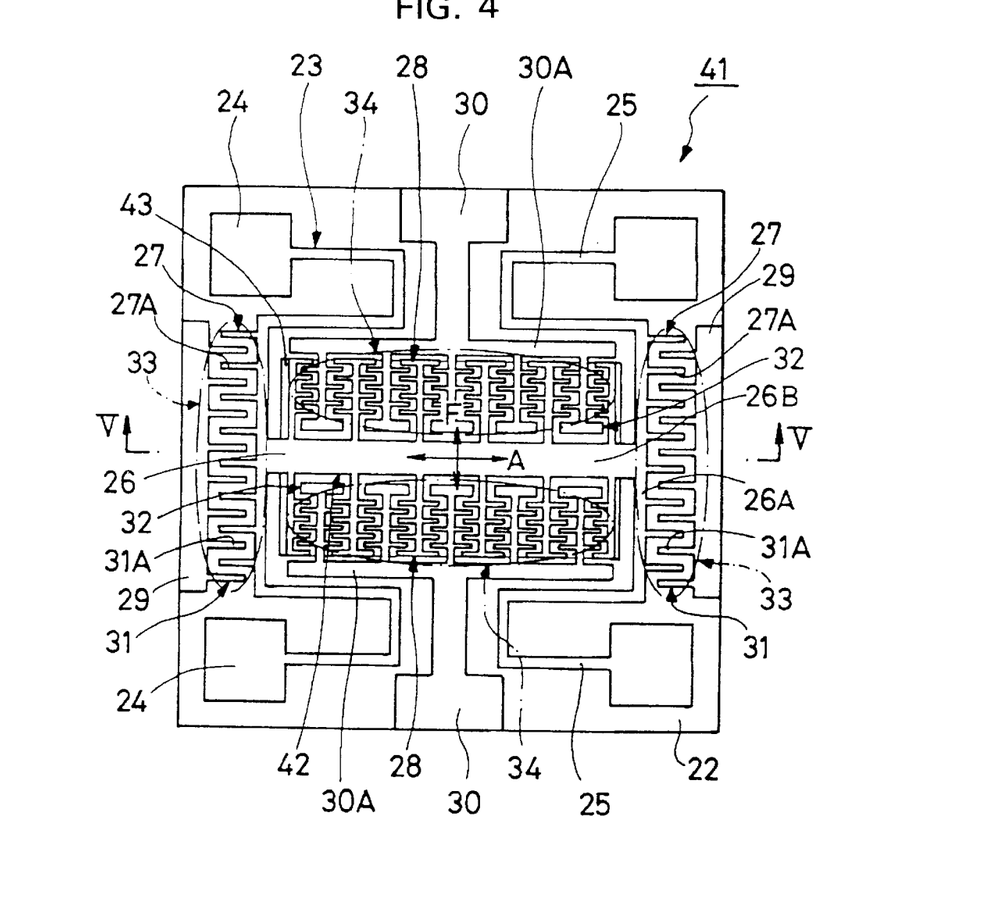
FIG. 4 is a plan view of an angular velocity sensor according to a second embodiment of the present invention as viewed from the top.
Figure 5:
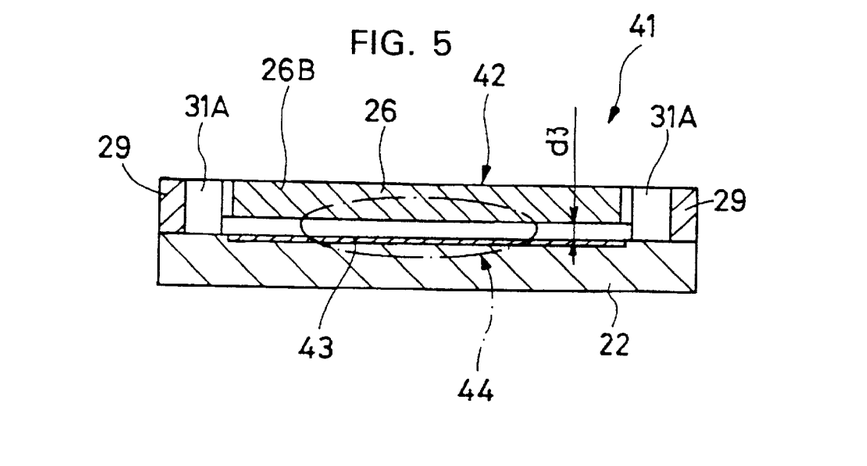
FIG. 5 is a longitudinal sectional view along line V—V of FIG. 4.

Referring to FIGS. 4 and 5, although an angular velocity sensor generally designated by 41 is constructed in a manner substantially similar to the angular velocity sensor 21 formed in accordance with the first embodiment, an electrode 43 (a detailed explanation given below) is disposed on the surface of the substrate 22 (the substrate electrode) in a position facing the oscillator 26 and the electrodes 28 constituting the moving-part antenna-like electrode array.

A moving-part electrode 42 is comprised of the oscillator 26 and a plurality of electrodes 28 explained in the first embodiment. The substrate electrode 43 oppositely facing the moving-part electrode 42 can be formed by ion-implanting impurities, such as P, B and Sb, into a predetermined position on the substrate 22. A second displacement-detecting section 44 serving as second displacement-detection means is constructed of the moving-part electrode 42 and the substrate electrode 43. A clearance having a dimension d3 is formed between the moving-part electrode 42 (formed of the oscillator 26 and the antenna-like electrodes 28) and the substrate electrode 43. This clearance can serve as a plane parallel capacitor. Namely, the effective area can be ensured between a combination of the oscillator 26 and the plurality of electrodes 28 and the substrate electrode 43.

In the angular velocity sensor 41 constructed as described above, as well as in the sensor 21 of the first embodiment, highly-precise detection can be implemented in a manner similar to the first embodiment, and more specifically, a highly-sensitive detecting operation can be performed by the first displacement-detecting sections 34, 34 upon generating the angular velocity around the Z axis while the oscillator 26 is caused to oscillate in the direction indicated by the arrow A by the oscillation-generating sections 33. Additionally, in this embodiment, a displacement of the oscillator 26 along the Z axis due to the angular velocity generated around the Y axis can be detected by the second displacement-detecting sections 44. Namely, the angular velocities around the two axes, i.e., the Y and Z axes, can be detected merely by the use of a single angular velocity sensor 41.

Also, the oscillator 26 and the antenna-like electrodes 28 are configured so that gaps can be formed between the electrode plates 28B. With this arrangement, air damping restricting the movement of the oscillator 26 can be reduced while ensuring the effective area, and also, the oscillator 26 and the electrodes 28 can be smoothly displaced along the Z axis. In the second displacement-detecting sections 44, as well as in the first detecting sections 34, the effective area between the substrate electrode 43 and the moving-part electrode 42 can be increased, thereby improving the sensitivity for detecting the angular velocity around the Y axis.

Additionally, the mass of the oscillator 26 is irrelevant in increasing the displacement of the oscillator 26 along the Y and Z axes. Also, the first displacement-detecting sections 34 are each disposed in the hollow region defined between each of the rod-like members 26A and the interconnecting portion 26B of the oscillator 26, while the second displacement-detecting sections 44 are each comprised of the moving-part electrode 42 (the oscillator 26 and the plurality of antenna-like electrodes 28) and the substrate electrode 43. With this construction, both the displacement detecting sections 34 and 44 can be accommodated within this region of the oscillator 26, thereby fulfilling the downsizing of the angular velocity sensor 41.

Figure 6:
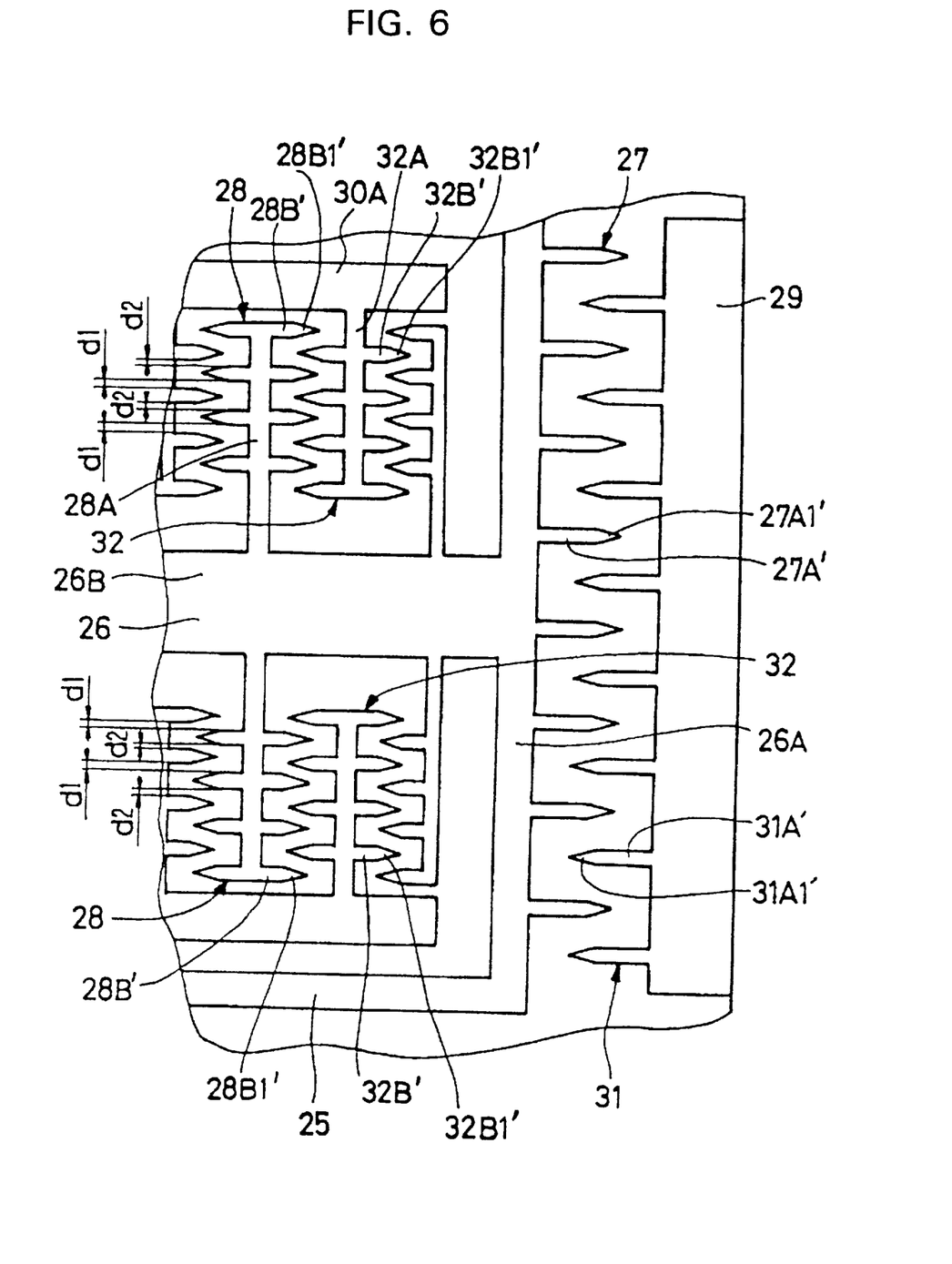
FIG. 6 is a plan view of the enlarged essential portion of an angular velocity sensor according to a third embodiment of the present invention.

A third embodiment of the present invention will be further explained with reference to FIG. 6. This embodiment is characterized in that the electrode plates 28B of the antenna-like electrodes 28, the electrode plates 32B of the antenna-like electrodes 32, the electrode plates 27A of the moving-part comb-like electrodes 27, and the electrode plates 31A of the stationary-part comb-like electrodes 31 are formed with sharp forward ends. In this embodiment, the same elements as those of the first embodiment are designated by like reference numerals, and an explanation thereof will thus be omitted. The features of this embodiment are marked by primed reference numerals.

More specifically, in this embodiment, the forward ends of the electrode plates 28B' of the respective antenna-like electrodes 28, the electrode plates 32B' of the respective antenna-like electrodes 32, the electrode plates 27A' of the moving-part comb-like electrodes 27, and the electrode plates 31A' of the stationary-part comb-like electrode plates 31 are respectively formed as sharp ends 28B1', 32B1', 27A1', and 31A1'. Accordingly, the escape vents for air required while the oscillator 26 is oscillating can be larger than in the first and second embodiments. This can further reduce the adverse influence of air damping, thereby enhancing the sensitivity of the sensor.

In the foregoing embodiments, the oscillation-generating sections 33 serving as the oscillation-generating means are actuated by the generation of electrostatic attractive forces. However, this is not exclusive, and other means, for example, a piezoelectric material, may be used to generate oscillations. Further, although in the first through third embodiments the displacement detecting sections 34 are disposed on both sides of the interconnecting portion 26B of the oscillator 26, the detecting section 34 may be formed on only one side of the interconnecting portion 26B. Further, the detecting section 34 may be disposed to extend beyond the hollow region defined between each of the rod-like members 26A and the interconnecting portion 26B.

As will be clearly understood from the foregoing description, the present invention offers the following advantages.

According to one form of the angular velocity sensor of the present invention, when the angular velocity around a vertical axis is generated while an oscillator is caused to oscillate by oscillation-generating means along one axis, i.e., a first horizontal axis, of the two horizontal axes, a Coriolis force can be produced to displace the oscillator along the other axis, i.e., a second horizontal axis. A displacement of the oscillator due to this Coriolis force can be detected as a change in capacitance by displacement detection means. Moreover, a hollow region is formed between each of the rod-like members and an interconnecting portion of the oscillator, and the displacement detection means can be at least partially located in the hollow region, thereby enhancing the downsizing of the angular velocity sensor.

According to another form of the angular velocity sensor of the present invention, the electrode plates of the moving-part antenna-like electrodes and those of the stationary-part antenna-like electrodes of the displacement detection means extend coaxially with the moving-part comb-like electrodes of the oscillation-generating means. This can eliminate a restriction upon the amplitude of the oscillator which would otherwise be limited by the displacement detection means, thereby achieving oscillation with a large amplitude. Additionally, the effective area between the moving-part antenna-like electrodes and the stationary-part antenna-like electrodes can be enlarged, thereby enhancing the sensitivity of the displacement detection means.

According to still another form of the angular velocity sensor of the present invention, the electrode plates of the moving-part antenna-like electrodes and the electrode plates of the stationary-part antenna-like electrodes are arranged to face each other so that the clearances between adjacent plates are sized to alternate between a smaller dimension and a larger dimension. This makes it possible to detect a displacement of the oscillator along the second horizontal axis in the form of a change in capacitance between adjacent electrode plates.

According to a further form of the angular velocity sensor of the present invention, the displacement detection means are constructed in such a manner that the forward ends of the moving-part electrodes and those of the stationary-part electrodes are formed to be sharp. With this arrangement, the gaps between the forward ends of the respective electrode plates can be enlarged. This can ensure escape vents for air required while the oscillator is oscillating so as to decrease air damping, thereby elevating detection sensitivity.

According to a further form of the angular velocity sensor of the present invention, upon generating the angular velocity around the vertical axis while the oscillator is caused to oscillate by, for example, oscillation-generating means along one axis, i.e., a first horizontal axis, of the two horizontal axes, a Coriolis force acting upon the oscillator displaces it along the other axis, i.e., a second horizontal axis. A displacement of the oscillator along the second horizontal axis due to this Coriolis force can be detected by first displacement-detection means as a change in capacitance. In contrast, when the angular velocity around the second horizontal axis is generated, a resulting Coriolis force displaces the oscillator along the vertical axis. A displacement of the oscillator due to this Coriolis force can be detected by second displacement-detection means as a change in capacitance. A hollow region can be formed between the rod-like member and the interconnecting portion of the oscillator, and thus, the displacement detection means can be at least partially placed in the hollow region, thereby fulfilling the downsizing of the angular velocity sensor.

According to a further form of the angular velocity sensor of the present invention, the electrode plates of the moving-part antenna-like electrodes and those of the stationary-part antenna-like electrodes of the displacement detection means extend coaxially with the moving-part comb-like electrodes of the oscillation-generating means. This can obviate a restriction upon the frequency of the oscillator, which would otherwise be limited by the displacement detection means, thereby achieving oscillations with a large amplitude. Also, the effective area between the moving-part electrodes and the stationary-part electrodes can be increased. Further, while the oscillator is caused to oscillate by the oscillation-generating means along one axis of the two horizontal axes, i.e., a first horizontal axis, a force is applied to generate an angular velocity around the other axis, i.e., a second horizontal axis. This produces a Coriolis force corresponding to a change in the angular velocity. Then, a displacement of the oscillator in the vertical direction due to this Coriolis force is detected. During this detection, the gaps between the moving-part electrodes and the stationary-part electrodes can serve as escape vents for air so as to reduce air damping. Thus, highly-precise detection of angular velocity can be accomplished.

According to a further form of the angular velocity sensor of the present invention, the first displacement-detection means is constructed in the following manner. The electrode plates of the moving-part electrodes and those of the stationary-part electrodes are arranged so that the clearances between adjacent plates can be alternately sized to have a larger dimension and a smaller dimension. Hence, a displacement of the oscillator along the second horizontal axis can be detected as a change in capacitance generated in adjacent electrode plates.

According to a further form of the angular velocity sensor of the present invention, the first displacement-detection means is constructed in such a manner that the forward ends of the electrode plates of the moving-part electrodes and those of the stationary-part electrodes are formed to be sharp. Thus, the gaps between the forwards ends of the electrode plates can be made larger, and escape vents for air required during oscillation can be ensured, thereby reducing air damping.

According to a further form of the angular velocity sensor of the present invention, the second displacement-detection means comprising the substrate electrode and a combination of the moving-part electrode and the oscillator can detect a displacement of the oscillator in the vertical direction in the form of a change in capacitance, thereby increasing the effective area by virtue of the provision of the moving-part antenna-like electrodes. Thus, highly-precise detection for angular velocity can be implemented.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An angular velocity sensor, comprising:

a substrate;

an oscillator having a hollow region, said oscillator supported on said substrate for movement along two horizontal axes;

oscillation-generator means for oscillating said oscillator along a first one of said horizontal axes; and displacement detection means located within said hollow region of said oscillator for detecting displacement of said oscillator along a second one of said horizontal axes when said oscillator is oscillated along said first horizontal axis and is subject to angular velocity around a vertical axis, wherein said oscillation-generating means comprises a moving-part comb-like electrode having a plurality of electrode plates extending along said first horizontal axis, and a stationary-part comb-like electrode disposed close to said substrate so as to opposedly face said moving-part comb-like electrode with a clearance, and wherein said displacement detection means comprises a moving-part antenna-like electrode and a stationary-part antenna-like electrode, said moving-part antenna-like electrode having a plurality of columnar portions disposed so as to axially extend in a direction orthogonal to the axis along which said comb-like electrodes are arranged, and a plurality of electrode plates provided for said columnar portions so as to extend coaxially with said comb-like electrodes, and said stationary-part antenna-like electrode having a plurality of columnar portions disposed close to said substrate so as to extend coaxially with the columnar portions of said moving-part antenna-like electrode, and a plurality of electrode plates provided for said columnar portions of said stationary-part antenna-like electrode so as to opposedly face the electrode plates of said moving-part antenna-like electrode with clearances therebetween.

2. An angular velocity sensor according to claim 1, wherein said displacement detection means is arranged in such a manner that the clearances between the electrode plates of said moving-part antenna-like electrode and the electrode plates of said stationary-part antenna-like electrode are sized to alternate between different dimensions.

3. An angular velocity sensor according to claim 1, wherein said displacement detection means is constructed in such a manner that forward ends of the electrode plates of said moving-part antenna-like electrode and forward ends of the electrode plates of said stationary-part antenna-like electrode are formed to be sharp.

4. An angular velocity sensor according to claim 2, wherein said displacement detection means is constructed in such a manner that forward ends of the electrode plates of said moving-part antenna-like electrode and forward ends of the electrode plates of said stationary-part antenna-like electrode are formed to be sharp.

5. An angular velocity sensor according to claim 2, wherein said displacement detection means further comprises a substrate electrode positioned oppositely to and spaced from said moving-part antenna-like electrode.

6. An angular velocity sensor according to claim 1, wherein said displacement detection means further comprises a substrate electrode positioned oppositely to and spaced from said moving-part antenna-like electrode.

7. An angular velocity sensor comprising:

a substrate;

a support beam fixed at a base end thereof to said substrate;

an oscillator disposed at a forward end of said support beam and displaceably provided along two horizontal axes in such a manner that said oscillator is detached from the surface of said substrate;

oscillation-generating means for oscillating said oscillator along a first horizontal axis of the two horizontal axes; and displacement detection means for detecting a displacement of said oscillator, the displacement being caused upon generating an angular velocity around a vertical axis while said oscillator is oscillated along the first horizontal axis by said oscillation-generating means, said oscillator being displaced along a second horizontal axis of the two horizontal axes due to a Coriolis force corresponding to a change in the angular velocity, wherein said oscillator includes two rod-like members extending along the second horizontal axis and an interconnecting portion extending along the first horizontal axis for connecting said two rod-like members, and wherein said displacement detection means is at least partially located between said two rod-like members of said oscillator.

8. An annular velocity sensor comprising:

a substrate;

a support beam fixed at a base end thereof to said substrate;

an oscillator disposed at a forward end of said support beam and displaceably provided along two horizontal axes in such a manner that said oscillator is detached from the surface of said substrate;

oscillation-generating means for oscillating said oscillator along a first horizontal axis of the two horizontal axes; and displacement detection means for detecting a displacement of said oscillator, the displacement being caused upon generating an angular velocity around a vertical axis while said oscillator is oscillated along the first horizontal axis by said oscillation-generating means, said oscillator being displaced along a second horizontal axis of the two horizontal axes due to a Coriolis force corresponding to a change in the angular velocity, wherein said oscillator includes two rod-like members extending along the second horizontal axis and an interconnecting portion extending along the first horizontal axis for connecting said two rod-like members, wherein said oscillation-generating means comprises a moving-part comb-like electrode having a plurality of electrode plates disposed near at least one of said rod-like members of said oscillator and extending along said first horizontal axis, and a stationary-part comb-like electrode disposed close to said substrate so as to opposedly face said moving-part comb-like electrode with a clearance, and wherein said displacement detection means is at least partially located between said two rod-like members of said oscillator, and comprises a moving-part antenna-like electrode and a stationary-part antenna-like electrode, said moving-part antenna-like electrode having a plurality of columnar portions disposed at least on one side of said interconnecting portion of said oscillator so as to axially extend in a direction orthogonal to the axis along which said comb-like electrodes are arranged, and a plurality of electrode plates provided for said columnar portions so as to extend coaxially with said comb-like electrodes, and said stationary-part antenna-like electrode having a plurality of columnar portions disposed close to said substrate so as to extend coaxially with the columnar portions of said moving-part antenna-like electrode, and a plurality of electrode plates provided for said stationary-part antenna-like electrode columnar portions so as to opposedly face the electrode plates of said moving-part antenna-like electrode with clearances therebetween.

9. An angular velocity sensor according to claim 8, wherein said displacement detection means is arranged in such a manner that the clearances between the electrode plates of said moving-part antenna-like electrode and the electrode plates of said stationary-part antenna-like electrode are sized to alternate between different dimensions.

10. An angular velocity sensor according to claim 8, wherein said displacement detection means is constructed in such a manner that forward ends of the electrode plates of said moving-part antenna-like electrode and forward ends of the electrode plates of said stationary-part antenna-like electrode are formed to be sharp.

11. An angular velocity sensor according to claim 9, wherein said displacement detection means is constructed in such a manner that forward ends of the electrode plates of said moving-part antenna-like electrode and forward ends of the electrode plates of said stationary-part antenna-like electrode are formed to be sharp.

12. An angular velocity sensor comprising:

a substrate;

a support beam fixed at a base end thereof to said substrate;

an oscillator disposed at the forward end of said support beam and displaceable along two horizontal axes and a vertical axis in such a manner that said oscillator is detached from the surface of said substrate;

oscillation-generating means for oscillating said oscillator along a first horizontal axis of the two horizontal axes;

first displacement-detection means for detecting a displacement of said oscillator, the displacement being caused upon generating an angular velocity around the vertical axis while said oscillator is oscillated along the first horizontal axis by said oscillation-generating means, said oscillator being displaced along a second horizontal axis of the two horizontal axes due to a Coriolis force corresponding to a change in the angular velocity; and second displacement-detection means for detecting a displacement of said oscillator, the displacement being caused upon generating an angular velocity around the second axis while said oscillator is oscillated along the first horizontal axis by said oscillation-generating means, said oscillator being displaced along the vertical axis due to a Coriolis force corresponding to a change in the angular velocity, wherein said oscillator includes two rod-like members extending along the second horizontal axis and an interconnecting portion extending along the first horizontal axis for connecting said two rod-like members, and wherein said first and second displacement-detection means are at least partially located between said two rod-like members of said oscillator.

13. An angular velocity sensor comprising:

a substrate;

a support beam fixed at a base end thereof to said substrate;

an oscillator disposed at the forward end of said support beam and displaceable along two horizontal axes and a vertical axis in such a manner that said oscillator is detached from the surface of said substrate;

oscillation-generating means for oscillating said oscillator along a first horizontal axis of the two horizontal axes;

first displacement-detection means for detecting a displacement of said oscillator, the displacement being caused upon generating an angular velocity around the vertical axis while said oscillator is oscillated along the first horizontal axis by said oscillation-generating means, said oscillator being displaced along a second horizontal axis of the two horizontal axes due to a Coriolis force corresponding to a change in the angular velocity; and second displacement-detection means for detecting a displacement of said oscillator, the displacement being caused upon generating an angular velocity around the second axis while said oscillator is oscillated along the first horizontal axis by said oscillation-generating means, said oscillator being displaced along the vertical axis due to a Coriolis force corresponding to a change in the angular velocity, wherein said oscillator includes two rod-like members extending along the second horizontal axis and an interconnecting portion extending along the first horizontal axis for connecting said two rod-like members, and wherein said first and second displacement-detection means are at least partially located between said two rod-like members of said oscillator, wherein said oscillation-generating means comprises a moving-part comb-like electrode having a plurality of electrode plates disposed near at least one of said rod-like members of said oscillator and extending along said first horizontal axis, and a stationary-part comb-like electrode disposed near said substrate so as to oppositely face said moving-part comb-like electrode with a clearance therebetween, and wherein said first displacement-detection means comprises a moving-part antenna-like electrode and a stationary-part antenna-like electrode, said moving-part antenna-like electrode having a plurality of columnar portions disposed at least on one side of said interconnecting portion of said oscillator so as to axially extend in a direction orthogonal to the axis along which said comb-like electrodes are arranged, and a plurality of electrode plates provided for said columnar portions so as to extend coaxially with said comb-like electrodes, and said stationary-part antenna-like electrode having a plurality of columnar portions disposed close to said substrate so as to extend coaxially with the columnar portions of said moving-part antenna-like electrode, and a plurality of electrode plates provided for the columnar portions of said stationary-part antenna-like electrode so as to oppposedly face the electrode plates of said moving-part antenna-like electrode with clearances therebetween.

14. An angular velocity sensor according to claim 13, wherein said first displacement-detection means is arranged in such a manner that the clearances between the electrode plates of said moving-part antenna-like electrode and the electrode plates of said stationary-part antenna-like electrode are sized to alternate between different dimensions.

15. An angular velocity sensor according to claim 13, wherein said first displacement-detection means is constructed in such a manner that forward ends of the electrode plates of said moving-part antenna-like electrode and forward ends of the electrode plates of said stationary-part antenna-like electrode are formed to be sharp.

16. An angular velocity sensor according to claim 14, wherein said first displacement-detection means is constructed in such a manner that forward ends of the electrode plates of said moving-part antenna-like electrode and forward ends of the electrode plates of said stationary-part antenna-like electrode are formed to be sharp.

17. An angular velocity sensor according to claim 13, wherein said second displacement-detection means comprises a combination of said moving-part antenna-like electrode and a substrate electrode disposed on said substrate so as to be opposite to and spaced from said moving-part antenna-like electrode.

18. An angular velocity sensor according to claim 14, wherein said second displacement-detection means comprises a combination of said moving-part antenna-like electrode and a substrate electrode disposed on said substrate so as to be opposite to and spaced from said moving-part antenna-like electrode.

19. An angular velocity sensor according to claim 15, wherein said second displacement-detection means comprises a combination of said moving-part antenna-like electrode and a substrate electrode disposed on said substrate so as to be opposite to and spaced from said moving-part antenna-like electrode.

20. An angular velocity sensor according to claim 16, wherein said second displacement-detection means comprises a combination of said moving-part antenna-like electrode and a substrate electrode disposed on said substrate so as to be opposite to and spaced from said moving-part antenna-like electrode.

* * * * *